United States Patent
van Lengerich et al.

(10) Patent No.: US 6,210,741 B1
(45) Date of Patent: *Apr. 3, 2001

(54) GRAIN BASED, EXTRUDED PRODUCT PREPARATION

(75) Inventors: Bernhard van Lengerich; Steven C. Robie, both of Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,551

(22) Filed: Dec. 1, 1999

Related U.S. Application Data

(63) Continuation of application No. 08/964,284, filed on Nov. 4, 1997, now Pat. No. 6,010,732.

(51) Int. Cl.$^7$ ............................... A23P 1/10; A23P 1/12

(52) U.S. Cl. ........................... 426/615; 426/93; 426/516; 426/621; 426/658

(58) Field of Search ........................... 426/93, 615, 621, 426/658, 516

(56) References Cited

U.S. PATENT DOCUMENTS

| | | |
|---|---|---|
| 3,927,222 | 12/1975 | Rosenquist et al. . |
| 4,465,447 | 8/1984 | Cheigh et al. . |
| 4,778,690 | 10/1988 | Sadel, Jr. et al. . |
| 4,891,238 | 1/1990 | Kurokawa et al. . |
| 5,326,583 | 7/1994 | Taga et al. . |
| 5,552,175 | 9/1996 | Camburn . |
| 5,694,833 | 12/1997 | Wenger . |
| 5,747,091 | 5/1998 | Denhartog et al. . |
| 5,939,124 | 8/1999 | Wenger . |
| 6,010,732 | * 1/2000 | van Lengerich et al. ........... 426/615 |

FOREIGN PATENT DOCUMENTS

| | | |
|---|---|---|
| 36 01 830 | 7/1987 | (DE) . |
| 481 513 | 4/1992 | (EP) . |

OTHER PUBLICATIONS

R.B. Fast, E.F. Caldwell, American Association of Cereal Chemists, 1990, *Breakfast Cereals and How They are Made*, pp. 159–161, and 175–178.

E.D. Beecher, M.S. Starer, Cereals Foods World, Oct. 1998, *Direct Expanded Cereals Produced on High–Speed High–Torque Twin Screw Extruders*, vol. 43, No. 10, pp. 753–757.

\* cited by examiner

*Primary Examiner*—Helen Pratt
(74) *Attorney, Agent, or Firm*—John A. O'Toole; Douglas J. Taylor; Everett G. Diederiks

(57) ABSTRACT

Disclosed are improved methods for preparing a grain based extrudate involving high screw speeds, short barrel length extruders and short residence times. Preferred methods of preparation reside in methods for preparing the present improved RTE cereal or snack products. The preferred methods contain the steps in sequence of feeding an at least partially ungelatinized grain based material to a cooker extruder having at least one rotating screw, said cooker extruder including a barrel preferably having a relatively short length to diameter ("L/D") ratio of substantially less than 12; working the grain based material by rotating the screw at a rotational speed of at least 700 rpm to mix and heat the cereal material and to compress the grain based material; and extruding the plasticized mass through at least one die orifice to form an extrudate. Its preferred product aspect provides RTE cereal or snack products in the form of a puffed grain based product piece having a density of about 10 to 100 g/l., a moisture content of 1.5% to 5%, and cell sizes expressed in cross sectional areas at the maximum diameter ranging from about 0.001 to 3 square millimeters with the majority of the cell sizes being substantially less than 1.0 square millimeters.

4 Claims, 1 Drawing Sheet

2mm

2mm

GRAIN BASED, EXTRUDED PRODUCT PREPARATION

This application is a continuation of U.S. patent application Ser. No. 08/964,284, filed Nov. 4, 1997, now U.S. Pat. No. 6,010,732.

FIELD OF THE INVENTION

The present invention relates to food products and to their methods of preparation. More particularly, the present invention relates to grain based extrusion preparation methods involving extremely high speed screw rotation and to the products prepared by such methods.

BACKGROUND

The use of cooker extruders to cook raw cereal materials and work the cooked cereal material to form cooked cereal doughs is well known. Such cooked cereal doughs find particular suitability for use in the preparation of Ready-To-Eat ("RTE") cereal products and grain based snack foods. Cooker extruder usage provides numerous advantages in preparing such cooked cereal doughs. One of the main advantages of using such cooker extruders is a short cooking or residence time that allows for high throughput rates. High throughput rates, in turn, lower the cost of producing cooked cereal dough products. The residence time in a conventional extruder generally ranges from about three minutes to as short as about 20 seconds.

While the high throughput rates allowed by short residence time of the cereal material is an important advantage, such advantages come with a cost. Cooked cereal doughs processed for short times generally lack the desirable flavor that develops over the extended cooking times of certain other cooked dough technologies. Extruder cooked cereal doughs frequently exhibit a less than desirable "raw" or "green" flavor.

The art is replete with efforts to overcome the flavor deficiencies of extruder cooked doughs. In one approach, various flavorings or flavor precursors are added to the raw cereal feed materials. In another approach, supplemental equipment is employed to provide longer residence times to which the cereal material is exposed to elevated temperatures. For example, preconditioners are known for use upstream of a cooker extruder to aid in cooked cereal flavor development. Also, downstream of the extruder, for example, extended pipes or temper bins are known for use to promote flavor development.

Moreover, whether upstream or downstream, such equipment is generally designed to minimize the amount of shear such equipment imparts to the cereal dough. Close control of the amount of shear that the dough experiences is important to the eating quality of the finished cereal products. In particular, it is desirable to avoid the organoleptic annoyance of tooth compaction, which generally is aggravated with increasing exposure to shear.

The present invention provides an improvement in extruder cooker methods of preparing and/or toasting grain based products. Surprisingly, the improvement resides in part in the employment of extremely high speed screw rotation extruder cookers in combination with short barrel lengths. The present inventive extruder cooker methods are importantly characterized by extremely short residence times (i.e., ≦10 seconds) in combination with high mechanical energy inputs to provide grain based extruded products. Not only does the art teach away from using short residence time and high mechanical energy input, both individually and in combination, but also the present invention provides surprising advantages. In particular, the present methods are useful to provide grain based products that upon extrusion puff or expand. While "direct" expansion puffed cereals are known, the puffed grain based products made by the present invention are characterized by extremely small cell size and can be produced from either flour, grits, meal, or entire grain kernels that have not been reduced in their particle size and at their normal storage moisture content with minimum addition of water, for example about 3% based upon total weight. In addition to their novelty appeal, surprisingly, the grain based products according to the present invention also exhibit unexpected and beneficial texture, flavor and aroma properties. The grain based products according to the present invention exhibit improved textures and surprisingly little undesirable tooth compaction compared to identical formulations fabricated into conventional shapes such as puffed spheres, filament shreds or flakes.

Also, the usual grittiness and dark colors associated with cereals from whole grain flours are not present with the grain based products of the present invention.

Other advantages of the present methods and products are described below.

SUMMARY

In its method of preparation aspect, the present invention resides in methods for preparing the present improved grain based products. The present invention's methods essentially comprise the steps in sequence of:

A. feeding an at least partially ungelatinized grain based material to a cooker extruder having at least one rotating screw, said cooker extruder including a barrel having preferably a relatively short length to diameter ("L/D") ratio, wherein the grain based material has a moisture content;

B. working the grain based material by rotating the screw to impart sufficient amounts of Specific Mechanical Energy ("SME") to mix, heat and liquify the grain based material to a plasterized mass and to force the mass against a die plate at a pressure, wherein the screw rotational speed is at least 700 rpm; and C. forcing the mass through at least one die orifice in the die plate to obtain an extrudate.

In its product aspect, the present invention provides grain based products in the form of a puffed grain based product piece suitable for use as an RTE cereal or grain based snack and having a density of about 10 to 100 g/l, a moisture content of 1.5% to 5%, and cell sizes expressed in cross section areas at the maximum diameter ranging from about 0.001 to 3 square millimeters with the majority of the cell sizes being substantially less than 1.0 square millimeters.

DETAILED DESCRIPTION OF THE INVENTION

Figure 1:
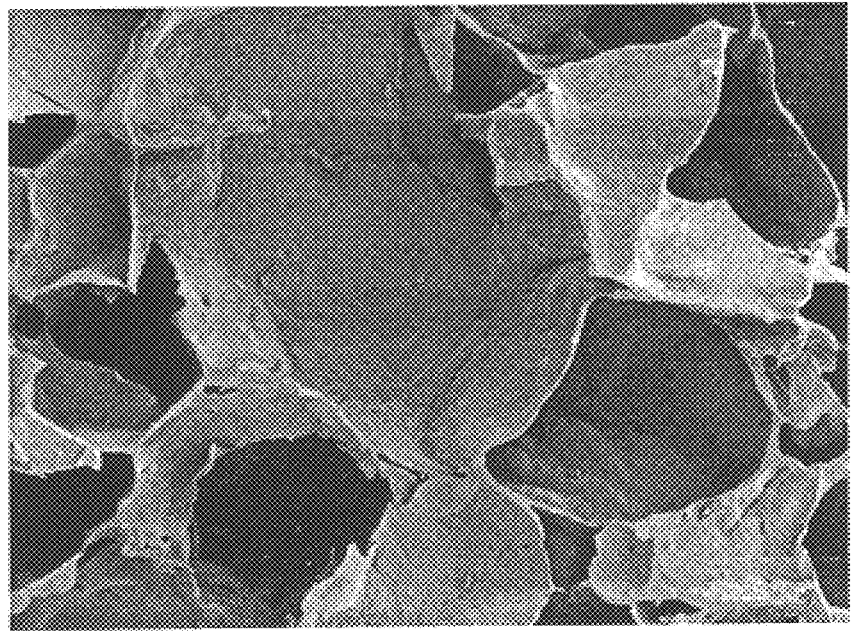
FIG. 1 shows a cross sectional view of a sample of a product made from conventional low rpm (<500 rpm) extrusion methods.

The present invention relates to improved extruder cooker methods for preparing grain based products. The grain based products are especially useful as RTE cereal products or can be used as grain based snacks. Each of the product ingredients as well as process steps and product use are described in detail below.

Throughout the specification and claims, temperatures are in degrees Centigrade and percentages are by weight unless otherwise indicated.

In the present methods, the first essential step is feeding a grain based material to a cooker extruder. The grain based feed material includes barley, wheat, oats, corn (maize), rice, rye, sorghum, and mixtures thereof.

The various initial grain based feed materials can be raw, i.e., not having been exposed to heat (other than experienced during normal handling and storage) and moisture so as to initiate gelatinization. Also, the initial feed materials may include cereal materials that have been previously exposed to some heat with or without moisture, e.g., steamed oat groats or oat flakes, bumped wheat, toasted whole grain oat flour, and cereal fines (i.e., broken pieces of cooked cereal dough products such as RTE cereals from previous or other productions runs). However, the feed material is generally at least partially ungelatinized. By "at least partially ungelatinized" is meant herein that of the total starch present in the feed material or blend, the ungelatinized percentage is at least 40% (40%≧). Preferably, the majority of the starch is ungelatinized, for example, the starch fraction of the feed material is primarily (50%≧) ungelatinized.

In one preferred embodiment, at least a portion of the feed material includes a whole grain cereal material, i.e., 1) starchy flour, 2) bran, and 3) germ components, whether provided by whole grain kernels or by combining the individual fractions.

The particle size of the ingredients of the feed material can include cereal flours and larger sized particles, such as corn (maize) cones, corn grits and the like, which can comprise at least 50% (dry weight basis) of the feed material. Surprisingly, however, the present methods can employ whole kernels of cereal grain and even of the larger grains such as corn (maize). In known extruder cooker cereal methods, whole grain and especially whole raw cereal grains can not be used as the starting material but only cut whole grain particles can be used as the starting material. Whole grains could not be used since their large particle size could undesirably result in cooked cereal doughs with uncooked or ungelatinized lumps. Such uncooked lumps can be visually and organoleptically undesirable. Additionally, whole kernels, that have not been treated prior to extrusion either mechanically and/or with moisture, are relatively hard and may block die openings that are smaller than the kernels. Due to the convenience and nutritional advantages of employing whole grains, in preferred embodiments, the present methods comprise grain based feed materials wherein at least a portion is supplied by whole kernel cereal grains. In one example of the embodiment, the feed material blend comprises at least 50% (dry weight basis) of whole grain corn (maize) without added nutritive carbohydrate sweeteners. Notwithstanding the absence of added sweeteners, the finished products surprisingly exhibit a taste of sweet corn. In other preferred embodiments, the feed material blends comprise at least 50% (dry weight basis) of whole grain wheat, whole grain oat, or whole grain rice.

Whole grain kernels and cereal fractions derived therefrom have native moisture contents. In part to prevent spoilage, whole cereal grains are typically dried to about 14% moisture for storage although grain based materials can have storage moisture values ranging from about 10% to 16%.

Typically, in known extruder cereal cooking methods, added water is required to wet the dry cereal feed materials in sufficient amounts to provide cooked cereal doughs having total moisture contents from about 25% and up to over 50%. However, in one preferred embodiment, the present methods involve adding no supplemental moisture. In other embodiments, the feeding step can be practiced involving a substep of adding sufficient water or moisture containing adjuvant materials to the feed material to add about 0% to 10% supplemental moisture to the native moisture content of the feed material. With the supplemental moisture, the feed material or blend can range in total moisture content from about 10% to 25%. In this variation, the added moisture can range from about 1% to 8%, preferably from about 1% to 6% and most preferably about 3% based upon total weight.

If desired, the feed material can additionally include a variety of supplemental materials to improve the flavor, texture, appearance, nutrition or other properties of the finished grain based product. For example, the feed material can optionally additionally include about 0% to about 40% (dry weight basis) of a nutritive carbohydrate sweetening ingredient. Common nutritive carbohydrate sweetening ingredients include common sugars such as sucrose, fructose, glucose, dextrose, invert sugar syrup, etc. These sugars can be pure or include less refined products such as brown sugar, molasses, honey and mixtures thereof. Other common sweetening ingredients include hydrolysis products of grain starches such as corn syrups, high fructose corn syrup, corn syrup solids, high fructose corn syrup solids, malt syrups and mixtures thereof. The sweetening ingredients can be added in dry form or as syrups that provide supplemental moisture.

Known cooker extruder methods of preparing cooked cereal dough products can include nutritive carbohydrate sweeteners(s) to provide a total sugar content (mono- and disaccharides) of an amount of about 15% (dry weight basis) of the dough. At substantially higher sugar contents, for example 20%, the extrusion cooking process undesirably forms doughs that either burn if the temperature is sufficiently high or do not expand because the low viscosity of the molten sugar prevents high pressure drops required for sufficient puffing The feed material blends may comprise about 1% to 40% and particularly greater than 15% to about 40%, as an example about 15% to about 25% (dry weight basis) total sugars. Such high sugar contents may be used to provide desirable sweetness in the final products.

The inlet or feed temperature of the grain based materials or blends can range from ambient temperatures (10° C. to 40° C.) up to about 100° C.

The grain based blend can additionally include about 1% to 4% of salt (sodium chloride), preferably about 1% to about 2%. If desired, potassium chloride can be used in full or partial substitution. Also, the grain based blend can additionally comprise about 1% to 10% of a calcium constituent to provide calcium fortification. Useful calcium materials include oyster shell, calcium carbonate, calcium phosphate salts, and mixtures thereof. If desired, a chocolate flavoring especially defatted cocoa powder can be used at about 1% to about 10% (dry weight basis) of the grain based blend.

The grain based feed material can optionally additionally include a source of soluble or insoluble fiber such as cellulose, carboxymethyl cellulose, pectin, psyllium, hemicellulose and mixtures thereof. The cereal art is replete with teachings concerning supplemental fiber fortification of cereals and the skilled artisan will have no difficulty selecting ingredients and materials for use herein. The feed materials can comprise about 1% to about 50% (dry weight basis) of such fiber source materials. Of course, when cereal based sources of fiber materials are employed, e.g., bran from plant sources such as from wheat, rice, corn, soy, oat, barley, sorghum, rye, etc., lesser amounts of non-cereal ingredients can be used. While non-cereal sources of fiber are well known, an advantage of the present methods is that the undesirable grittiness typically associated with insoluble fiber usage and the undesirable slimy mouthfeel associated with soluble fiber usage may be greatly reduced in the finished products of the present invention.

The feed material or blend with adjuvant materials is fed to a cooker extruder having a rotating screw capable of both high rates of rotation and rapidly imparting high rates of mechanical energy to the feed material. By high rates of rotation herein is meant capable of at least 700 rpm, preferably greater than 1000 rpm.

Extruder length is also an important process parameter. Extruder lengths are typically expressed in relation to their barrel diameter or "L/D" ratio. Conventional cooker extruders are characterized by L/D ratios ranging from about 12 to 40. In contrast however, the extruders in the preferred embodiment are characterized as being very short, namely, having a L/D ratio of substantially less than 12 L/D, preferably <10 L/D, and most preferably ≦6 L/D. Such extruders are commercially available. A twin screw extruder can perform the mixing, heating, liquifying and forming steps all in a single piece of equipment. As a result, a twin screw extruder provides the advantage of a practical and commercially economical technique for practicing the invention. Good results have been obtained using a high-speed twin screw cooker extruder available from Werner & Pfleider, Inc. (Model No. ZSK 058 Mega Compounder).

After feeding the grain based material to the cooker extruder, the next essential step is working the feed material by rotating the extruder screw to impart sufficient amount of mechanical energy to mix, heat and liquify the feed material to a plasticized mass having at least gelatinization temperatures. Moreover, the screw working serves to compress the feed material and to work the feed material at extremely short residence times.

During the working step, the screw is rotated at operative speeds of at least 700 rpm and preferably over 1000 rpm. The temperature of the plasticized mass is higher than in conventional extruder cooking methods. Measured immediately upstream of the die orifice, the mass temperature ranges from about 120° to 280°. With exit temperatures substantially exceeding 280° C., puffed grain based products can develop an undesirable burnt flavor. However, at slightly lower exit temperatures, the puffed grain based products can develop and exhibit a desirable toasted flavor.

The pressure within the extruder during the working step can range from 50 to 400 bar.

Generally, the use of high shaft rotation speeds should lead to imparting high shear to the grain based product. Cooked cereal doughs that have been subjected to high shear form RTE cereals and cooked cereal products that upon consumption exhibit undesirable tooth packing.

Surprisingly, however, in the present invention, notwithstanding the utilization of extremely high shaft rotation rates, the finished products exhibit very low levels of undesirable tooth compaction.

The present working step is practiced to impart extremely high Specific Mechanical Energy ("SME") to the grain based material. As its name implies, SME is used to characterize the amount of mechanical energy or work that the extruder imparts to the material being worked. Conventional extruder cooking imparts about 90 to 150 W-hr./kg. (or, equivalently, 0.09 to 0.15 kW-hr./kg.) of SME to the cooked cereal dough. The present invention is practiced so as to impart at least 100 to 250 W-hr./kg. of SME to the grain based product.

The combination of high rotational speeds and short extruder lengths provide extremely short residence times. In contrast to conventional methods, typical extruder residence times in the present methods are less than 10 seconds (<10s), preferably <8s, and most preferably ≦5s. It is speculated herein that such short residence times, even at such higher pressures and temperatures, minimize the development of scorching.

Thereafter, the grain based product is forced or extruded through at least one die orifice to form a grain based product extrudate. Depending upon the size and shape of the orifice, the extrudate can be in the form of filaments, strands, ropes, etc. Of course, shaped orifices can be used to give a cross sectional shape to the extrudate. Upon extrusion, the grain based product puffs or expands to a density of about 10 to 100 g/l.

If desired, the cooker extruder system can be equipped with a reciprocating or rotating knife such as a rotating knife having sufficient number of blades and operating at sufficient speed as to separate the exiting extrudate into equal pieces having a l/d ratio between 0.1 and 10 such as having about 2–32 blades and operating at about 1000 to 4000 rpm to sever the extrudate rope into individually sized and shaped pieces.

The grain based product pieces so prepared are useful as RTE cereals or, generally in slightly larger pieces, can be used as grain based snack products. In addition to being of normal crispiness, the products of the present invention have a softer hardness than products made from conventional lower rpm (<500 rpm) extrusion methods. Also, the products of the present invention have a higher dissolveability in the mouth and have a lower tooth packing than products made from conventional lower rpm (<500 rpm) extrusion methods. Surprisingly, even whole grain variations fail to exhibit grittiness or tooth packing. Further, the products of the present invention have a substantially developed toasted grain flavor compared to a cooked flavor of products made from conventional low rpm (<500 rpm) extrusion methods which do not develop a toasted flavor during extrusion. It should be appreciated that on a scale from raw to bland to cooked to toasted to burned, the cooker extruder system of the present invention allows control of the flavor from raw to burned whereas conventional lower rpm (<500 rpm) cooker extruder systems provided control only from raw to cooked. RTE cereal products prepared from whole kernel wheat upon the addition of milk release a burst of pleasing wheat aroma. Products made from degermed corn (maize) or even whole kernel corn may exhibit the flavor of sweet corn and exceeding the normal, cooked flavor of products made from conventional lower rpm (<500 rpm) extrusion methods, even when the added nutritive carbohydrate component is less than 5%.

Figure 2:
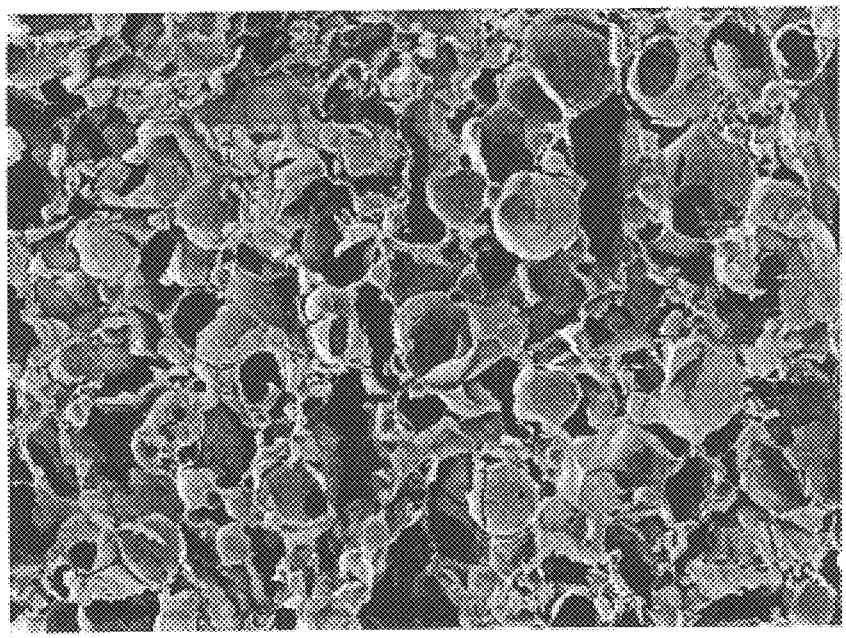
FIG. 2 shows a cross sectional view of a sample of a product prepared according to methods of the preferred teachings of the present invention.

The puffed cereal products are surprisingly characterized by a minute, foamy cell size as shown in FIG. 2, with the cell sizes expressed in cross section areas at the maximum diameter ranging from about 0.001 to 3 square millimeters with the majority of the cell sizes being substantially less than 1.0 square millimeters and specifically the cell size is much smaller than the cell size of products made from conventional lower rpm (<500 rpm) extrusion methods as shown in FIG. 1. It should be appreciated that this minute, foamy cell size of the products of the present invention as shown in FIG. 2 is obtained without injection of air, carbon dioxide, or other gas into the barrel of the cooker extruder and with relatively low water content. In this regard, it can be appreciated that high water content is essential for carbon dioxide incorporation but requires thermal energy input via high barrel temperatures and substantially longer residence times to cook the grain. High water content generally leads to a collapse of the foam. Flavor development is also very limited when high water contents are used to produce directly expanded products.

The products can be provided with a sweetener coating or can be supplied with topically applied vitamins or other flavors. In a preferred variation, the sugar coating step comprises a first sub step of applying a sugar coating slurry having a moisture content of about 2% to 15% by weight of the slurry to the pieces to form slurry coated pieces; and then drying the slurry coated pieces to a final moisture content of about 2% to 5%.

The products so prepared can be conventionally packaged and distributed for sale to the consumer.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method of preparing an extruded grain based product comprising the steps of:

A. feeding an at least partially ungelatinized grain based material to a cooker extruder having at least one rotating screw, said cooker extruder including a barrel having a length to diameter ("L/D") ratio, with the extruder barrel having an L/D of $\leq 6$ and wherein the grain based material includes greater than about 15% to about 40% of a nutritive carbohydrate sweetening ingredient and has a moisture content;

B. working the grain based material by rotating the screw to impart sufficient amounts of Specific Mechanical Energy ("SME") to mix, heat and liquify the grain based material to a plasticized mass and to force the plasticized mass against a die plate at a pressure, wherein the screw rotational speed is at least 700 rpm and the residence time of the grain based material blend is $\leq 5$ seconds; and C. forcing the plasticized mass through at least one die orifice in the die plate to obtain an extrudate.

2. The method of claim 1, wherein the at least partially ungelatinized grain based material is fed in step A to a twin screw extruder.

3. The method of claim 2, wherein the twin screw extruder performs mixing, heating, liquifying and forming steps on the grain based material.

4. The product prepared by the method of claim 1.

* * * * *